United States Patent [19]

Kohli

[11] Patent Number: 4,608,431
[45] Date of Patent: Aug. 26, 1986

[54] POLYIMIDE FROM UNSATURATED IMIDE, POLYAMINE AND ALDEHYDE

[75] Inventor: Dalip K. Kohli, Norwalk, Conn.

[73] Assignee: American Cyanamid Co., Stamford, Conn.

[21] Appl. No.: 695,991

[22] Filed: Jan. 29, 1985

[51] Int. Cl.$^4$ .................. C08G 12/06; C08G 12/26
[52] U.S. Cl. ........................... 528/246; 528/127; 528/149; 528/150; 528/248; 528/253; 528/322
[58] Field of Search ............... 528/246, 322, 248, 253, 528/127, 149, 150

[56] References Cited

U.S. PATENT DOCUMENTS

| | | | |
|---|---|---|---|
| 3,018,290 | 1/1962 | Sauers | 260/326.3 |
| 3,625,912 | 12/1971 | Vincent | 260/32.6 |
| 3,732,189 | 5/1973 | Crivello et al. | 260/78 UA |
| 3,883,486 | 5/1975 | Bargain | 528/322 |
| 4,012,361 | 3/1977 | Bargain | 528/322 |
| 4,064,192 | 12/1977 | Bargain | 528/322 |

*Primary Examiner*—Harold D. Anderson
*Attorney, Agent, or Firm*—William H. Calnan

[57] ABSTRACT

A method for making polyimide polymers is provided by effecting reaction between an aliphatically unsaturated imide, such as maleimide, formaldehyde, and an organic polyamine, for example trimethylene bis(4-aminobenzoate), for example in refluxing ethanol. The polyimides produced by the simple one-step method are pure, and exhibit superior toughness, and reduced shrinkage upon cure by heating. The new product are useful as molding compounds, laminating resins, and the like, being especially suitable for airplane parts, advanced composites, high performance adhesives and printed circuit boards.

11 Claims, No Drawings

POLYIMIDE FROM UNSATURATED IMIDE, POLYAMINE AND ALDEHYDE

The present invention relates to polyimides and a method for making them.

BACKGROUND OF THE INVENTION

Polyimide resins are useful per se for molding, in high temperature-resistant adhesive and in laminates. They are also useful in lacquers so as to form, when the solvent is removed, flexible coatings which are strongly adherent to metal substrates and which exhibit excellent resistance to elevated temperatures. They find use in aircraft, in mold and laminated advanced composites, in wire coatings and in printed circuit boards.

Conventional polyimides are generally prepared by the reaction of a dianhydride and a diamine, e.g., pyromellitic dianhydride and diaminodiphenyl ether. State of the art polyimides are prepared by reacting maleic anhydride with organic polyamines, e.g., diaminodiphenyl sulfone or diaminodiphenylmethane. Representative of relevant disclosures of such processes are Sauers, U.S. Pat. No. 3,018,290, Vincent, et al., U.S. Pat. No. 3,625,912 and Crivello, et al., 3,732,189. In general, all such procedures require at least two stages for synthesis, and also one or more purification steps to produce the products in pure form. Moreover, there are some limits as to ultimate physical properties, especially toughness, provided by presently known polyimides.

It has now been discovered, and is the subject of the present invention, that modifying the general procedure somewhat drastically will produce a new class of bisimide resins by a simple one step synthesis and that they will be produced in substantially pure form. The substitution of an unsaturated imide for the commonly employed anhydride and the use of formaldehyde or a formaldehyde precursor to form a methylene bridge between the imide nitrogen and the polyamine nitrogen are the bases of the present invention.

SUMMARY OF THE INVENTION

According to the present invention there are provided resinous polyimides and a method for making them which comprises contacting
(i) an unsaturated imide of the formula

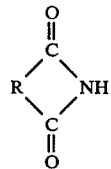

wherein R is an aliphatically unsaturated hydrocarbon radical;
(ii) from about 0.5 to about 2 moles per mole of (i) of formaldehyde or a formaldehyde precursor; and
(iii) from about 0.5 to 2 moles per mole of (i) of an organic polyamine.

A preferred family of polyimides provided by the present invention will be bismaleimides of the formula

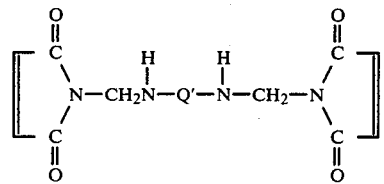

wherein Q' is a divalent radical comprising at least two aryl radicals attached directly to each other or through a member selected from an alkylene radical, straight chain or branched, of from 2 to 12 carbon atoms,

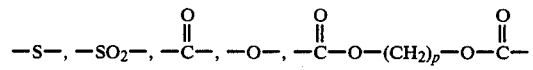

wherein p is from 2 to 12, or Q' is a divalent radical comprising an aliphatic or cycloaliphatic radical, straight chain or branched, of from 2 to 12 carbon atoms, which may also contain,

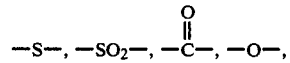

and the like, or a mixture of any of the foregoing.

These will provide better toughness and lower shrinkage on curing than state of the art systems.

DETAILED DESCRIPTION OF THE INVENTION

With respect to the unsaturated imide (i) used as the starting material R is an aliphatically unsaturated divalent organo radical, for example,

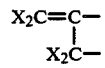

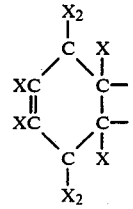

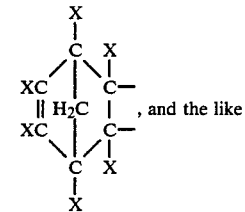

wherein X is selected from hydrogen, lower alkyl (i.e., $C_1$–$C_6$ alkyl), halogen, or mixtures thereof, such as chloro, methyl, ethyl, propyl, bromo, and the like.

Some of the unsaturated imides which can be employed are, for example, maleimide, citraconimide, itaconimide, tetrahydrophthalimide, endomethylenetetrahydrophthalimide or "Nadic imide"; also known as endo-cis-5-norbornene-2,3-dicarboximide, methyl-substituted and halogen-substituted nadic imides, for instance hexachloroendomethylenetetrahydrophthalimide, and the like, can also be employed. Preferably, however, maleimide will be used. All such can be readily made.

When used herein and in the appended claims, the term "formaldehyde or a formaldehyde precursor" is used in its broadest sense to include gaseous formaldehyde and formaldehyde solutions and obvious chemical equivalents capable of generating formaldehyde under the conditions of the reaction, such as paraformaldehyde, trioxymethylene, and complexes of formaldehyde with alcohols, and the like. Preferred for use herein is a 37 weight % solution of gaseous formaldehyde in water, usually stabilized in commerce with 10–15% of a lower alkanol, e.g., methanol.

Some of the organic polyamines which can be employed in the practice of the invention as component (iii) are of the formula, $$Q'-(NH_2)_n$$

wherein Q' is as defined above and n is from 2 to 4.

Among the specific polyamines which are useful in connection with the present invention, alone or in admixture, are those listed below: p-xylylene diamine; bis(4-amino-cyclohexyl)methane; hexamethylene diamine; heptamethylene diamine; octamethylene diamine; nonamethylene diamine; decamethylene diamine; 3-methyl-heptamethylene diamine; 4,4'-dimethylheptamethylene diamine; 2,11-diaminododecane; 1,2-bis-(3-amino-propexy)ethane; 2,2-dimethyl propylene diamine; 3-methoxy-hexamethylene diamine; 2,5-dimethylhexamethylene diamine; 2,5-dimethylheptamethylene diamine; 5-methylnonamethylene diamine; 1,4-diamino-cyclohexane; 1,12-diamino-octadecane; 2,5-diamino-1,3,4oxadiazole; $H_2N(CH_2)_3O(CH_2)_2O(CH_2)_2NH_2$; $H_2N(CH_2)_3S(CH_2)_3NH_2$; $H_2N(CH_2)_3N(CH_3)(CH_2)_3NH_2$; meta-phenylene diamine; paraphenylene diamine; 4,4'-diamino-diphenyl propane; 4,4'-diamino-diphenyl methane; benzidine; 4,4'-diaminodiphenyl sulfide; 4,4'-diamino-diphenyl sulfone; 3,3'-diamino-diphenyl sulfone; 4,4'-diamino-diphenyl ether; 2,6-diamino-pyridine; bis(4-amino-phenyl)-diethyl silane; bis(4-amino-phenyl)diphenyl silane; bis(4amino-phenyl)phosphine oxide; 4,4'-diaminobenzophenone; bis(4-aminophenyl)-N-methylamine; bis(4-aminobutyl)tetramethyldisiloxane; 1,5-diaminonaphthalene; 3,3'-dimethyl-4,4'-diamino-biphenyl; 3,3'-dimethoxy benzidine; 2,4'-bis(beta-amino-t-butyl)toluene; toluene diamine; bis(parabeta-amino-butyl-phenyl)ether; para-bis(2-methyl-4-aminopenty)benzene; parabis(1,1dimethyl-5-amino-pentyl)benzene; m-xylylene diamine; alkylene bis(aminobenzoate); and polymethylene polyanilines of formula

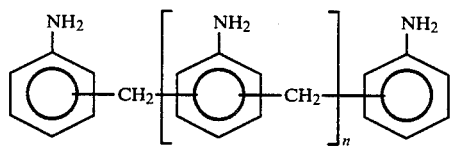

where n is from about 0.1 to 10 and preferably about 0.3, and the like.

Special mention is made of preferred polyamines of the formulae:

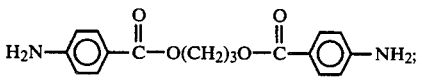

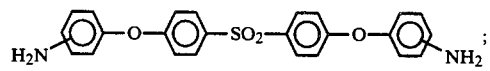

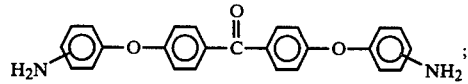

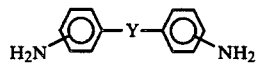

wherein Y is $$-CH_2-, -O-, -SO_2-, \text{ or } -\overset{\overset{\displaystyle R}{|}}{\underset{\underset{\displaystyle R}{|}}{C}}-,$$

R being hydrogen, $C_1$-$C_6$ alkyl, etc. These are known compounds.

These bismaleimides can be cured alone or with diamines to provide polyimides of the formula (1) and (2)

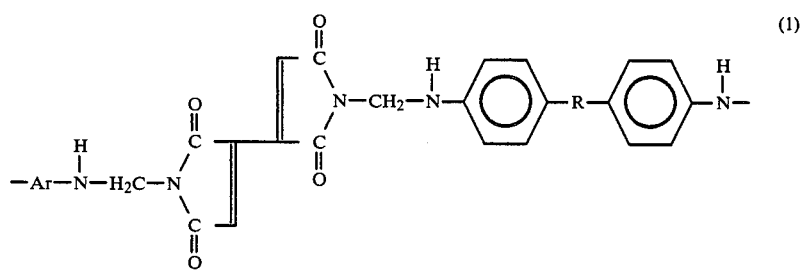

(1)

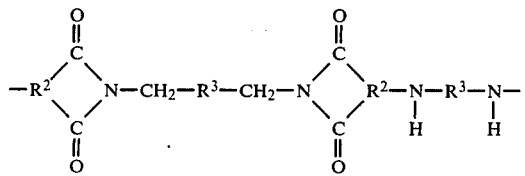

where R[2] is a divalent organo radical free of aliphatic unsaturation, and R[3] is a polyvalent organo radical selected from Q' radicals and other polyvalent organo radicals derived from polyamines.

The bismaleimides can also be copolymerized with other bismaleimides such as

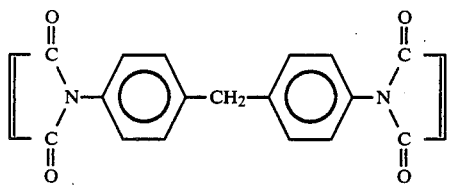

other known bismaleimides. In addition to bismaleimides other suitable co-reactants include divinylbenzene or diallyl bisphenol A.

Radicals illustrative of R[2] are derived from R, which are free of aliphatic unsaturation as a result of amine addition across the double bond. Radicals illustrative of R[3], in addition to Q' radicals as previously defined are polyvalent organo radicals such as trisubstituted phenyl radicals, tetrasubstituted phenyl radicals, trisubstituted triazines, trisubstituted naphthalenes, etc., such as

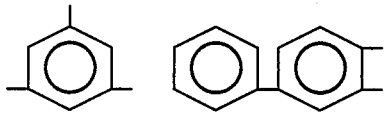

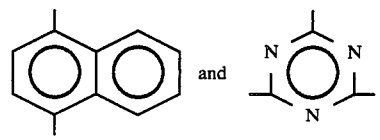

Among the preferred polyimides provided by the method of the present ivention, are polyimides having at least a major proportion, i.e., at least about 50 mole percent, and up to 100 mole percent of chemically combined units of the formula,

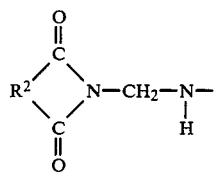

and from 0 to about 50 mole percent of chemically combined units of the formula,

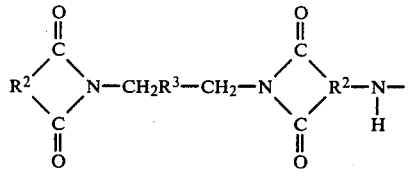

based on the total moles of units.

In the above formulas, where R, Q', R[2] and R[3] respectively can represent more than one radical, these radicals can be all the same or any two or more of the aforementioned radicals.

Some of the preferred polyimides of the invention can consist of at least a major amount of chemically combined units, such as,

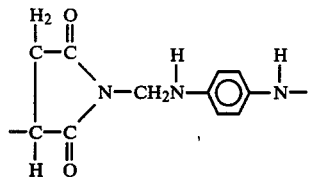

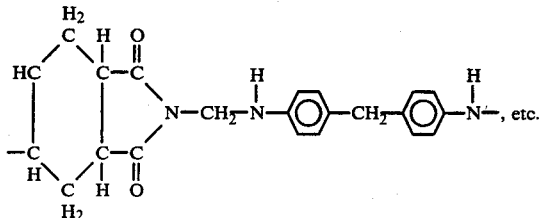

The polymers of the present invention can be employed as paints, laminates, thermosetting resins, adhesives, coatings, binders, wire varnishes, etc. Two applications of special interest are in the areas of thermosetting molding compounds and laminating resins. Catalysts can be employed, such as from 1 to 5 percent by weight of a free radical catalyst, for example dicumyl peroxide, or anionic catalysts to cure the resins made by the method of the invention. The addition of catalysts is not necessary, when high temperatures such as above 200° C. are employed during fabrication. When the above resins are used to impregnate glass cloth, laminates having desirable properties may be made by heating layers of the impregnate under pressure at temperatures from 180°–300° C.

In the practice of the invention, the aliphatically unsaturated imide or "imide" and the organic polyamine, or "polyamine", are contacted while maintaining a temperature in the range of between about 25° C. to 250° C.

The proportion of imide to formaldehyde to polyamine can vary widely. Effective results can be achieved if from 0.1 to 10 moles of both formaldehyde and polyamine, per mole of imide is employed and preferably from 0.5 to 2 moles of formaldehyde and of polyamine per mol of the imide.

Experience has shown that desirable results can be achieved by reaction in organic solvents. Suitable organic solvents which can be used are benzonitrile, nitrobenzene, dimethylformamide, dimethylacetamide, dimethylsulfoxide, N-methylpyrrolidine, acetic acid, propionic acid, acetonitrile, dichlorobenzene, 1,4-dioxane, nitromethane, anisole, diphenyl ether, cresol, lower alkanols, e.g., ethanol, alone or mixed with water, and the like. The organic solvent can be employed to facilitate contact between the reactants and to recover the final product. Ethanol and water in combination are preferred.

At temperatures in the range of between 80° C. to 115° C. reaction time can be as long as 1 to 15 hours or less. In some instances, depending upon such factors as the reactants, effective results can be achieved at room temperature. If alcohol is used, refluxing is convenient.

Recovery of the monomers can be effected by standard methods such as precipitation by pouring the reaction mixture into an excess of appropriate media, such as methanol, ethanol, water, benzene, and the like.

The bismaleimides provided by the invention can be blended with inorganic fillers, e.g., at up to 75 percent by weight or higher of the resulting blend. For example, blends of the bismaleimides and inorganic fillers such as silica, glass fibers, graphite, carbon fibers, asbestos, titanium oxide, etc., can be cured with organic peroxides at up to 5 percent by weight of the blend. Organic peroxides such as dicumyl peroxide, benzoyl peroxide, tetriary butyl perbenzoate, cumene hydroperoxide, etc., can be employed. The resulting compositions can be molded to make bearings, automobile parts, airplane parts, printed circuit boards, and the like.

DESCRIPTION OF THE PREFERRED EMBODIMENTS

In order that those skilled in the art will be better able to practice the invention, the following examples are given by way of illustration and not by way of limitation. All parts are by weight.

EXAMPLE 1

A mixture of 19.4 parts of maleimide, formaldehyde (18 ml. of a 40% aqueous solution) and 31.4 parts of 1,3-trimethylene bis(4-aminobenzoate) (Polaroid Corp., POLACURE 740-M) are suspended in 300 ml. of ethanol and the mixture is refluxed at 85° C. for 6 hours. The product is recovered by filtration. It is a yellow solid, which melts at 198°–200° C. parts by weight are obtained, which represents a 60% yield. The structure

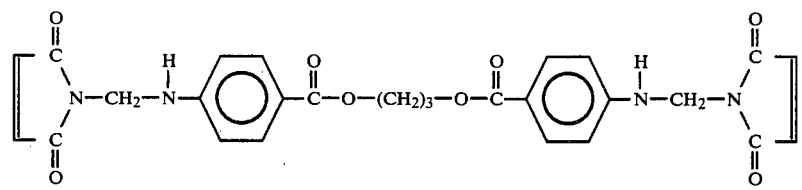

is confirmed by nuclear magnetic resonance (NMR) and infrared spectral analysis (IR).

To make a cured composition a blend of 100 parts of the above resin and 0.5–2 parts of dicumyl peroxide is molded to a test bar at 250° C. at 500 psi for 3 hours. The molded bar exhibits superior toughness and lower shrinkage on cure than state of the art resins.

EXAMPLE 2

The procedure of Example 1 is repeated, substituting for the aminobenzoate, an equivalent amount of 4,4'-bis(3-aminophenoxy)-diphenylsulfone, and the corresponding 4,4'-bis(4-aminophenoxy)isomer. These are obtained respectively, polyimides according to this invention of the formula:

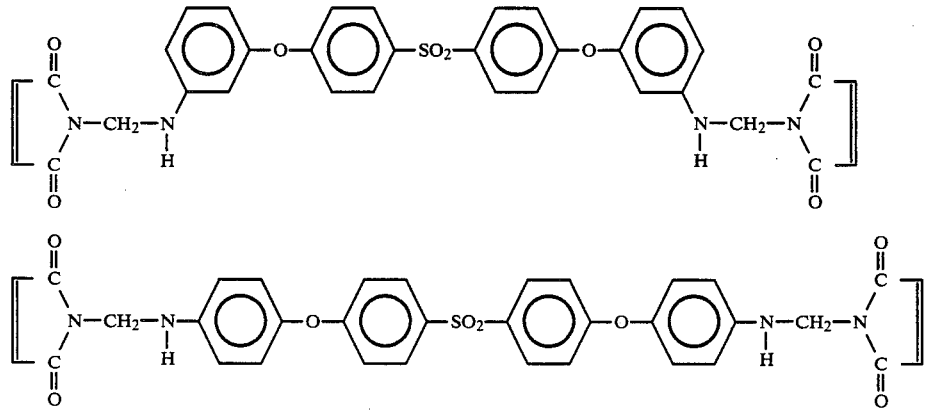

EXAMPLE 3

The procedure of Example 1 is repeated substituting the following arylene diamines

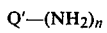

| E | NH$_2$ | NH$_2$ |
|---|---|---|
|  | 3'- | 3'- |
|  | 4- | 4'- |
| —CH$_2$— | 3- | 3'- |
| —CH$_2$— | 4- | 4'- |
| —O— | 3- | 3'- |
| —O— | 4- | 4'- |
| —SO$_2$— | 3- | 3'- |
| —SO$_2$— | 4- | 4'- |
| —CO— | 3- | 3'- |
| —CO— | 4- | 4'- |
| —S—CH$_2$CH$_2$—S— | 2- | 2'- |

The correspondingly substituted resinous polyimides according to this invention are obtained.

The above-mentioned patents and publications are incorporated herein by reference. Many variations will suggest themselves to those skilled in this art in light of the above detailed description. All such obvious variations are within the full intended scope of the appended claims.

I claim:

1. A method for making a resinous polyimide which comprises contacting
   (i) an unsaturated imide of the formula

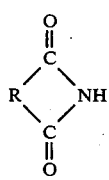

wherein r is an aliphatically unsaturated hydrocarbon radical;
   (ii) from about 0.5 to about 2 moles per mole of (i) of formaldehyde or a formaldehyde precursor; and
   (iii) from about 0.5 to 2 moles per mole of (i) of an organic polyamine.

2. A method as defined in claim 1 wherein R in compound (i) is selected from

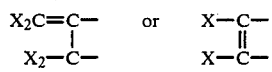

thereof, wherein X is selected from hydrogen, lower alkyl, halogen, or mixtures thereof.

3. A method as defined in claim 2 wherein R in compound (i) is

H—C—
       ‖
    H—C—

4. A method as defined in claim 1 wherein compound (ii) comprises formaldehyde.

5. A method as defined in claim 4 wherein the formaldehyde is dissolved in water and a lower alkanol.

6. A method as defined in claim 1 wherein polyamine compound (iii) is of the formula $$Q'—(NH_2)_n$$

wherein Q' is a radical comprising at least two aryl radicals attached directly to each other or through a member selected from an alkylene radical, straight chain or branched, of from 2 to 12 carbon atoms, —S—, —SO$_2$—, —CO—, —O—, —CO$_2$—(CH$_2$)$_p$—CO$_2$— where p is from 2 to 12, or a mixture of any of the foregoing, or Q' is a radical comprising an aliphatic or cycloaliphatic radical, straight chain or branched, of from 2 to 12 carbon atoms, optionally containing

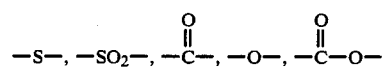

or a mixture of any of the foregoing; and wherein n is from 2 to 4.

7. A method as defined in claim 6 wherein Q' is a divalent radical comprising at least two aryl radicals attached directly to each other or through a member selected from an alkylene radical, straight chain or branched, of from 2 to 12 carbon atoms, —S—, —SO$_2$—, —CO—, —O—, —CO$_2$—(CH$_2$)$_p$—CO$_2$—, wherein p is from 2 to 12, or a mixture of any of the foregoing, and n is 2.

8. A method as defined in claim 7 wherein the polyamine compound (iii) is of the formula

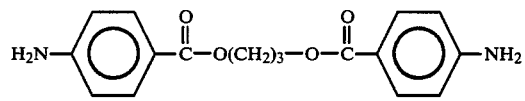

9. A method as defined in claim 7 wherein the polyamine compound (iii) is of the formula

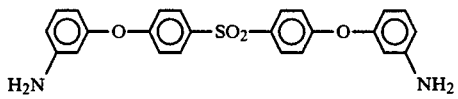

10. A method as defined in claim 7 wherein the polyamine compound (iii) is of the formula

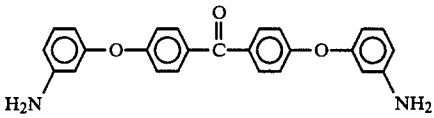

11. A method as defined in claim 7 wherein the polyamine compound (iii) is of the formula

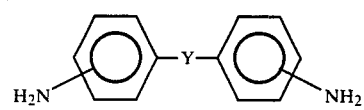
wherein Y is
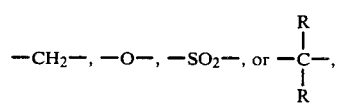
R being hydrogen or $C_1$–$C_6$ alkyl.
* * * * *